(12) United States Patent　　(10) Patent No.:　US 12,595,431 B2

Kurkela et al.　　(45) Date of Patent:　Apr. 7, 2026

(54) METHOD AND APPARATUS FOR PURIFYING GAS AND USE

(71) Applicant: TEKNOLOGIAN TUTKIMUSKESKUS VTT OY, Espoo (FI)

(72) Inventors: Esa Kurkela, Vtt (FI); Ilkka Hiltunen, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 931 days.

(21) Appl. No.: 17/765,716

(22) PCT Filed: Oct. 7, 2020

(86) PCT No.: PCT/FI2020/050661

§ 371 (c)(1),
(2) Date: Mar. 31, 2022

(87) PCT Pub. No.: WO2021/069798

PCT Pub. Date: Apr. 15, 2021

(65) Prior Publication Data

US 2022/0364003 A1　　Nov. 17, 2022

(30) Foreign Application Priority Data

Oct. 8, 2019　　(FI) ..................................... 20195858

(51) Int. Cl.
B01D 53/22 　　(2006.01)
B01D 53/86 　　(2006.01)
(Continued)

(52) U.S. Cl.
CPC ............ C10K 3/023 (2013.01); B01D 53/864 (2013.01); C10J 3/84 (2013.01); *B01D 2255/20715* (2013.01); *C10J 2300/0986* (2013.01)

(58) Field of Classification Search
CPC .................. C10K 3/023; B01D 53/864; B01D 2255/20715; C10J 3/84; C10J 2300/0986
See application file for complete search history.

(56) References Cited

U.S. PATENT DOCUMENTS

2010/0120926 A1* 　5/2010　Robinson ............... C10K 1/004
　　　　　　　　　　　　　　　　　　518/703
2010/0181539 A1* 　7/2010　Apanel .................. C10K 1/002
　　　　　　　　　　　　　　　　　　252/373
(Continued)

FOREIGN PATENT DOCUMENTS

CA 　　　　2739270 A1 * 　1/2010　............... C10J 3/66
FI 　　　　　116944 B　　4/2006
(Continued)

OTHER PUBLICATIONS

Brief Summary in English of JP Office Action for Japanese patent application 2022-521341 dated Sep. 24, 2024, 5 pages.
(Continued)

*Primary Examiner* — Anthony Shumate
(74) *Attorney, Agent, or Firm* — Brooks Kushman P.C.

(57) ABSTRACT

The invention relates to a method and an apparatus for purifying gas, wherein the gas which includes at least tars and/or undesired hydrocarbons is supplied to a catalytic treatment reactor which has at least one catalyst zone including at least one catalyst element with a catalyst, oxygen gas is fed into the catalyst element of the catalyst zone in the catalytic treatment reactor and is supplied through the catalyst element, the gas is arranged to flow to the catalyst zone and arranged to contact with the oxygen (Continued)

gas and the catalyst, and a purified gas is discharged from the catalytic treatment reactor. Further, the invention relates to the use of the method.

8 Claims, 3 Drawing Sheets

(51) Int. Cl.
   C10J 3/84 (2006.01)
   C10K 3/02 (2006.01)

(56) References Cited

U.S. PATENT DOCUMENTS

| | | | |
|---|---|---|---|
| 2011/0062387 A1 | 3/2011 | Anfang et al. | |
| 2011/0104575 A1 | 5/2011 | Mui et al. | |
| 2012/0091395 A1 | 4/2012 | Tetzlaff | |
| 2012/0207668 A1* | 8/2012 | Schmidt | B01J 38/06 |
| | | | 423/652 |
| 2015/0275111 A1 | 10/2015 | Chandran | |
| 2021/0355392 A1* | 11/2021 | Greager | C10G 2/34 |
| 2022/0119715 A1* | 4/2022 | Greager | C10K 3/005 |

FOREIGN PATENT DOCUMENTS

| | | |
|---|---|---|
| JP | 2003055671 A | 2/2003 |
| JP | 2007153665 A | 6/2007 |
| JP | 2009195863 A | 9/2009 |
| JP | 2009280633 A | 12/2009 |
| JP | 2009292706 A | 12/2009 |
| JP | 2010525120 A | 7/2010 |

OTHER PUBLICATIONS

International Search Report for PCT/FI2020/050661, Prepared by the European Patent Office, mailing date Jan. 1, 2021, 3 pages.
Finnish Search Report, Prepared by the Finnish Patent and Registration Office, Dated Apr. 20, 2020, 1 page.
EP Office Action, Communication pursuant to Article 94(3) EPC for corresponding EP Patent Application EP 20 797 1 534.3-1101, Prepared by the European Patent Office, Dated Jun. 26, 2026 (Jun. 26, 2026), 6 pages.

* cited by examiner

METHOD AND APPARATUS FOR PURIFYING GAS AND USE

CROSS-REFERENCE TO RELATED APPLICATION

This application is the U.S. national phase of PCT Application No. PCT/FI2020/050661 filed on Oct. 7, 2020, which claims priority to FI patent application No. 20195858 filed on Oct. 8, 2019, the disclosures of which are incorporated in their entirety by reference herein.

FIELD

The application relates to a method for purifying gas containing impurities and an apparatus for purifying gas comprising impurities. Further, the application relates to a use of the method.

BACKGROUND

Known from the prior art is to gasify different biomass and waste raw materials in gasifiers and to produce gasification gases. Further, it is known that the gasification gases comprise impurities, such as tars, some hydrocarbons and other compounds. Further, different gas cleaning methods are known from the prior art. The gasification gas can be cleaned by washing by means of many washing stages. However, the light hydrocarbons cannot be separated by washing. Further, the gasification gas can be cleaned by means of a catalytic reformer in which tars and hydrocarbons can be converted to products. However, specific catalysts, such as noble metal or nickel catalysts, are needed in the catalytic reforming, and a construction of the reformer is complicated with several different layers and catalysts. Further, the gasification gas can be cleaned by means of a thermal cracking, in which unstable tars are degraded at high temperatures. However, polyaromatic hydrocarbons (PAH) and carbon black form during the the the catalytic reforming and the thermal cracking.

OBJECTIVE

The objective is to solve the above problems. Further, the objective is to disclose a new type method and apparatus for purifying gas, such as synthesis gas. Further, the objective is to remove tars and undesired hydrocarbons from the gas. Further, the objective is to disclose a new type method and apparatus for treating the synthesis gas. Further, the objective is to improve a quality of the synthesis gas.

SUMMARY

The method and apparatus and use are characterized by what are presented in the claims.

In the method and apparatus, the gas which comprises at least tars and/or undesired hydrocarbons is treated in a catalytic treatment reactor comprising a catalyst zone.

BRIEF DESCRIPTION OF THE DRAWINGS

The accompanying drawings, which are included to provide a further understanding of the invention and constitute a part of this specification, illustrate some embodiments of the invention and together with the description help to explain the principles of the invention. In the drawings.

DETAILED DESCRIPTION

Figure 1:
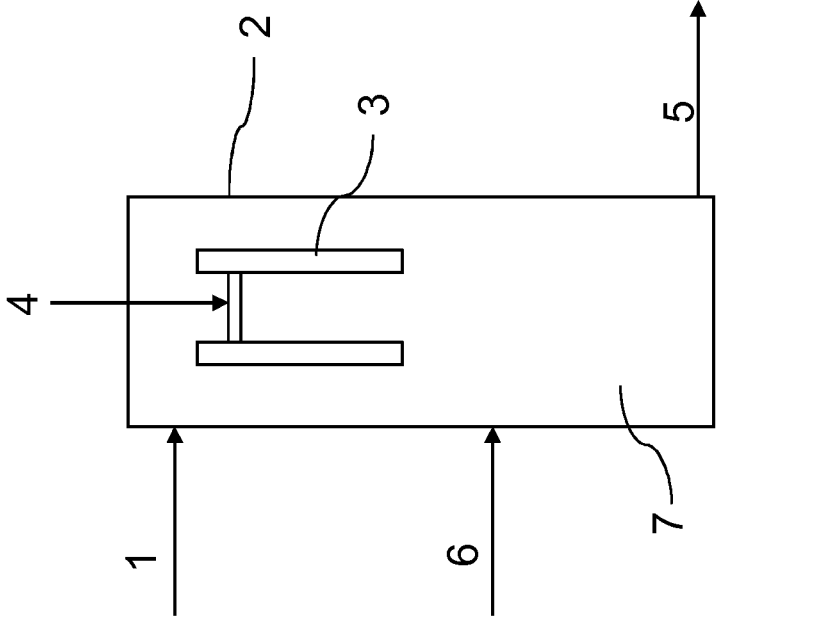
FIG. 1 is a flow chart illustration of a process according to one embodiment.

In a method for purifying gas, e.g. synthesis gas, the gas (1) which comprises at least tars and/or undesired hydrocarbons as impurities is supplied to a catalytic treatment reactor (2) which comprises at least one catalyst zone (3) including at least one catalyst element with a catalyst, and oxygen gas (4) is fed into the catalyst element of the catalyst zone (3) in the catalytic treatment reactor and the oxygen gas is supplied through the catalyst element. The gas (1) is arranged to flow to the catalyst zone (3) and arranged to contact with the oxygen gas (4) and the catalyst in the catalyst zone, wherein the gas reacts with the oxygen gas by means of a catalytic partial oxidation on the catalyst, and a purified gas (5) is formed. The purified gas (5) is discharged from the catalytic treatment reactor. In one embodiment, the oxygen gas is supplied to a middle of the catalyst element and is arranged to flow from the middle of the catalyst element to the surface of the element.

An apparatus for purifying gas comprises at least one catalytic treatment reactor (2) to which the gas (1) which comprises at least tars and/or undesired hydrocarbons as impurities is supplied. The catalytic treatment reactor (2) comprises at least one catalyst zone (3) including at least one catalyst element with a catalyst. Further, the apparatus comprises at least one feeding device for feeding oxygen gas (4) into the catalyst element of the catalyst zone (3) in the catalytic treatment reactor and for supplying the oxygen gas through the catalyst element. In the reactor (2), the gas (1) is arranged to flow to the catalyst zone (3) and arranged to contact with the oxygen gas (4) and the catalyst in the catalyst zone in order to form a purified gas. In one embodiment, the feeding device is arranged to feed the oxygen gas to a middle of the catalyst element in which the oxygen gas is arranged to flow from the middle of the catalyst element to the surface of the element.

Figure 2:
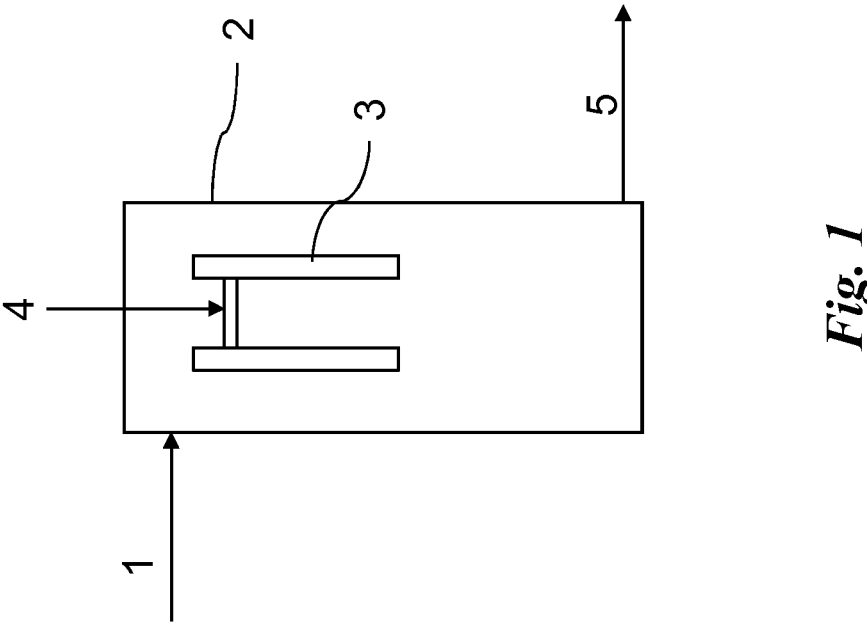
FIG. 2 is a flow chart illustration of a process according to another embodiment.
Figure 3:
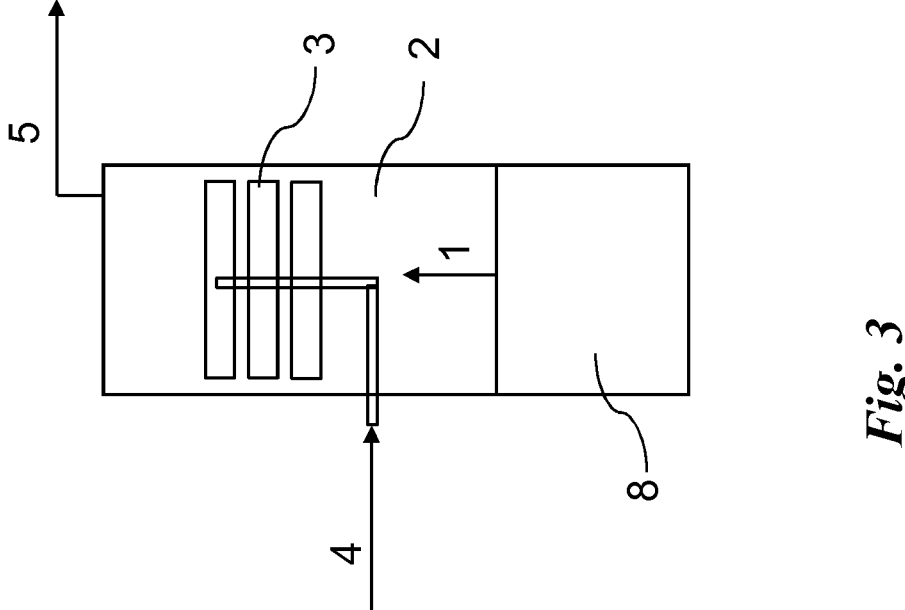
FIG. 3 is a flow chart illustration of a process according to another embodiment.
Figure 4:
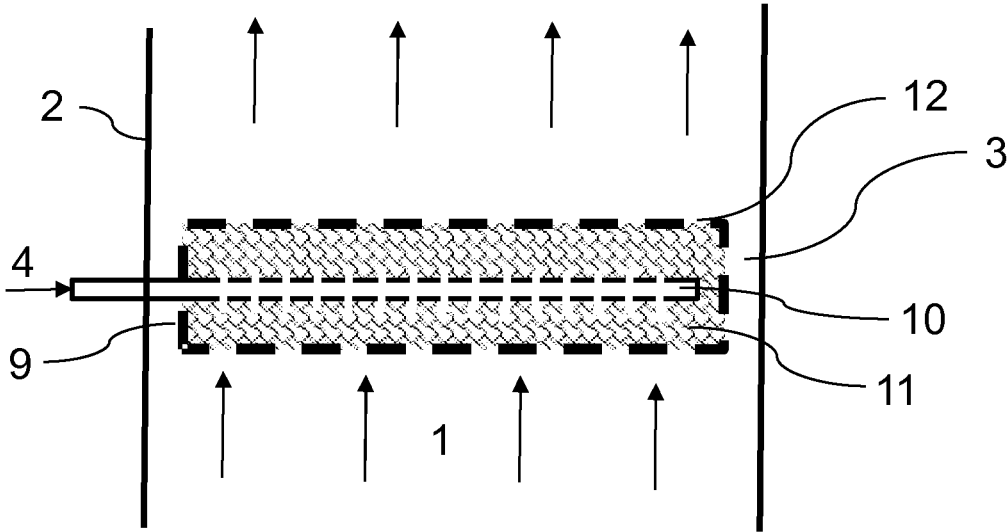
FIG. 4 shows a catalyst element according to one embodiment.

One embodiment of the method and the apparatus is shown in FIG. 1. Other embodiments of the method and the apparatus are shown in FIGS. 2 and 3. One embodiment of the catalyst element of the catalyst zone is shown in FIG. 4.

In this context, the gas (1) means any gas, such as synthesis gas, gasification gas, coke oven gas or other gas, which comprises at least tars and/or undesired hydrocarbons, e.g. heavy and/or light hydrocarbons, as impurities. The gas can consist of one or more main components. The gas can comprise carbon dioxide, carbon monoxide and/or hydrogen as the main components. Further, the gas can comprise also other components, e.g. inert components, dust, particulates and/or water. Further, the gas can comprise other impurities. In one embodiment, at least tars are removed by the present method. In one embodiment, at least undesired hydrocarbons, e.g. benzene, toluene and/or phenol, are removed by the present method. In one embodiment, the gas is a flow from a gasifier.

In this context, the oxygen gas (4) means any oxygen-containing gas, such as a reaction gas, including oxygen. The oxygen gas can consist of one or more main components. In one embodiment, the oxygen gas comprises air. In one embodiment, the oxygen gas comprises oxygen and water steam. In one embodiment, the oxygen gas comprises oxygen and carbon dioxide. In one embodiment, the oxygen gas comprises oxygen, water steam and carbon dioxide. In one embodiment, the oxygen gas is used as a reactant in the catalytic treatment reactor (2).

In one embodiment, the catalyst is selected from zirconium-based materials, such as zirconium oxide, or calcium-containing materials, such as dolomite, or materials containing metals, such as nickel or precious metals. Alternatively, any suitable catalyst can be used as the catalyst.

In one embodiment, the catalytic treatment reactor (2) comprises one catalyst zone (3). In one embodiment, the catalytic treatment reactor comprises more than one catalyst zones (3).

In one embodiment, the catalyst zone (3) comprises one catalyst element. In one embodiment, the catalyst zone (3) comprises more than one catalyst elements. In one embodiment, the catalyst element comprises one or more than one catalyst. In one embodiment, the catalyst element comprises a catalyst bed or a catalyst layer, through which the gas feed can be supplied. In one embodiment, the catalyst element comprises at least one catalyst on the surface of the catalyst element, and the gas feed can be arranged to flow beside the catalyst element or by the side of the catalyst element.

In one embodiment, the catalyst is formed particles. In one embodiment, the catalyst bed or the catalyst layer is formed from the catalyst particles. In one embodiment, the catalyst is arranged as a coating on a desired substrate, e.g. carrier surface, to form a catalyst surface. In one embodiment the substrate can be a surface of plate, pipe, tube or the like. In one embodiment the catalyst is arranged as the coating onto a metal substrate, in which metal can be any metal, e.g. steel, aluminum, other metal or their combination. In one embodiment, the catalyst is arranged as the coating onto a ceramic substrate. In one embodiment, the catalyst is arranged as a coating on a substrate, e.g. as a washcoating, onto a metal surface or ceramic surface. In one embodiment, the catalyst element is formed from a coated element which has been coated with the catalyst. In one embodiment, the surface of the catalyst element, e.g. inner and/or outer surface of the element, is formed from the catalyst surface. In one embodiment, the catalyst element is formed from the catalyst or the catalyst particles. In one embodiment, the catalyst element is filled with the catalyst.

The gas (1) reacts with the oxygen gas (4) on the catalyst. In one embodiment, the gas (1) reacts with the oxygen gas (4) on the surface of the catalyst. In one embodiment, the gas (1) reacts with the oxygen gas (4) in the pores of the catalyst. In one embodiment, the gas (1) reacts with the oxygen gas (4) on the surface and/or in the pores of the catalyst. In one embodiment, the gas (1) reacts with the oxygen gas (4) in the catalyst bed or in the catalyst layer. In one embodiment, the gas (1) reacts with the oxygen gas (4) on the surface and/or in the pores of the catalyst particles in the catalyst bed or in the catalyst layer. In one embodiment, the gas (1) reacts with the oxygen gas (4) on the surface of the catalyst element. In one embodiment, the gas (1) reacts with the oxygen gas (4) on the surface of the catalyst of the catalyst element and/or in the pores of the catalyst of the catalyst element. When the oxygen gas is fed directly into the catalyst element and the gas reacts with the oxygen gas and with the catalyst in the catalyst zone, PAH compounds and carbon black do not form.

In one embodiment, the catalyst element (9) comprises a distributor pipe (10) for supplying the oxygen gas, the catalyst (11) which is loaded around the distributor pipe, and a perforated supporting structure (12) to surround the distributor pipe (10) and the catalyst (11). In one embodiment, the oxygen gas (4) is injected to a center of the catalyst element (9) through a distributor pipe (10) which is a perforated tube or a tube equipped with several nozzle holes. In one embodiment, granular catalyst particles of the catalyst (11) are loaded around the oxygen distributor pipe to form a catalyst layer. In one embodiment, the oxygen gas (4) is injected to the center of the catalyst element (9) through a distributor pipe (10) and the oxygen gas flows from the center of the catalyst element through the catalyst layer and meets the gas (1) in the catalyst layer, on the catalyst surfaces or in the pores of the catalyst.

In one embodiment, the catalyst zone (3) is arranged to a desired part of the catalytic treatment reactor (2).

In this context, the catalytic treatment reactor (2) means any reactor which comprises at least one catalyst zone. The catalytic treatment reactor (2) can be a separate device or a part of another device, e.g. a part of the gasifier, a first part of thermal cracking, a part of the reformer, or a pre-reformer. In one embodiment, the catalytic reactor is an upper part of the gasifier, e.g. a fixed-bed gasifier. In one embodiment, the catalytic treatment reactor is arranged before a filtration device. In one embodiment, the catalytic treatment reactor (2) is a tube reactor or tubular reactor.

The feeding device for feeding the oxygen gas (4) to the catalytic treatment reactor (2) can be any feeding device, equipment or other suitable device. In one embodiment, the feeding device can be selected from the group comprising compressor, preheating unit, injection device, injector, distributor, dividing device, tube, pipe, other suitable feeding device and their combinations.

In one embodiment, the apparatus comprises at least one oxygen gas feed inlet for supplying the oxygen gas (4) into the catalyst zone (3) and into the catalyst element. In one embodiment, the oxygen gas (4) is fed into the catalyst element of the catalyst zone (3) by means of one oxygen gas feed inlet. In one embodiment, the oxygen gas is supplied into the catalyst zone by means of at least two oxygen gas feed inlets. In one embodiment, the oxygen gas is supplied into at least two the catalyst zones by means of at least two oxygen gas feed inlets. Preferably, the oxygen gas is supplied always into the catalyst element of the catalytic treatment reactor (2) and through the catalyst. In one embodiment, the oxygen gas is supplied into the catalyst bed or layer of the catalyst element.

In one embodiment, the apparatus comprises at least one gas feed inlet for supplying the gas (1) into the catalytic treatment reactor (2). In one embodiment, the gas (1) is fed to a space outside the catalyst zone in the catalytic treatment reactor (2). In one embodiment, the gas feed inlet is arranged before the catalyst zone (3) in the catalytic treatment reactor (2). In one embodiment, the gas (1) is supplied into the catalyst zone (3) in the catalytic treatment reactor. Preferably, the gas (1) is not supplied to the same feed point than the oxygen gas in the catalytic treatment reactor, and the gas is not supplied together with the oxygen gas.

In one embodiment, the apparatus comprises at least one outlet for discharging the purified gas (5) out from the catalytic treatment reactor (2).

The oxygen gas feed inlet and gas feed inlet may be any suitable inlets known per se, e.g. pipe, port or the like. The outlet may be any suitable outlet known per se, e.g. pipe, outlet port or the like.

In one embodiment, temperature of the gas (1) is about 300-900° C., in one embodiment 300-800° C. and in one embodiment 300-600° C., when the gas is supplied to the catalytic treatment reactor (2). In one embodiment, temperature of the purified gas (5) is about 800-1000° C., when the purified gas is discharged from the catalytic treatment reactor (2). In the catalytic treatment reactor, the gas (1) can be heated and the temperature of the gas (1) can be increased when the oxygen gas (4) is supplied through the catalyst to contact with the gas (1). In one embodiment, temperature level of the gas can be increased step by step or by stepwise increase from the temperature of the gas to the reaction temperature. Further, then carbon black does not form.

The purified gas (5) is formed in the catalytic treatment reactor (2). In one embodiment, the tar content and/or undesired hydrocarbon content of the gas can be decreased during the reaction. In one embodiment over 70% by weight, preferably over 80% by weight, of the tars can be decomposed or converted during the reaction. In one embodiment, the tar content of the purified gas (5) is below 10 g/m³, in one embodiment below 5 g/m³ and in one embodiment below 2 g/m³. In one embodiment over 60% by weight, preferably over 70% by weight, more preferably over 80% by weight, of the undesired hydrocarbons can be decomposed or converted during the reaction.

In one embodiment, the purified gas (5) can be treated, post-treated or supplied to a next process or a next process step after the catalytic treatment reactor (2). In one embodiment, the purified gas is filtrated. In one embodiment, the purified gas can be supplied to a desired treatment process, e.g. for forming hydrocarbons.

In one embodiment, the apparatus comprises more than one catalytic treatment reactors (2). In one embodiment, at least two or more reactors are arranged in parallel. In one embodiment, at least two or more reactors are arranged sequentially.

In one embodiment, further the gas is treated by a thermal treatment, e.g. thermal cracking, in a thermal treatment zone (7) after the catalyst zone (3), and the gas is treated at temperatures of 1000-1300° C. in the thermal treatment. In one embodiment, the apparatus comprises thermal treatment zone (7), e.g. thermal cracking, after the catalyst zone, and the gas is further treated by heat treatment at temperatures of 1000-1300° C. in the thermal treatment zone. In one embodiment, an additional oxygen gas (6) is fed before the thermal treatment zone (7) or to the thermal treatment zone.

In one embodiment, the method is based on a continuous process. In one embodiment, the apparatus is a continuous apparatus. In one embodiment, the method is based on a batch process. In one embodiment, the apparatus is a batch apparatus.

In one embodiment, the method and the apparatus can be used and utilized in a purification of the gas, a production of the synthesis gas, a purification of the synthesis gas, a production of hydrocarbons, manufacturing of fuels, or their combinations.

Thanks to the invention the gas, such as the synthesis gas, can be purified, and tars and/or undesired hydrocarbons, e.g. benzene, can be decomposed or converted easily and effectively. Then the purified gas can be filtrated without problems. Further, a post-treatment is not needed to perform for removing tars. Further, temperature of the gas can be increased without risks for soot formation.

The method and apparatus offer a possibility to form the purified gas flow and also products with good properties easily, and energy- and cost-effectively. For example, an amount of the catalyst is low compared with prior art reformers. The present invention provides an industrially applicable, simple and affordable way to treat the gas comprising impurities. The method and apparatus are easy and simple to realize in connection with production processes.

EXAMPLES

Example 1

FIG. 1 presents the method and also the apparatus for purifying the gas, such as synthesis gas, comprising tars and undesired hydrocarbons, e.g. benzene.

The apparatus comprises a catalytic treatment reactor (2) to which the gas (1) which comprises tars and undesired hydrocarbons is supplied. The catalytic treatment reactor (2) comprises the catalyst zone (3) with two vertical catalyst elements. Same catalyst including at least one catalyst component is arranged to the each catalyst elements. Further, the apparatus comprises at least one feeding device for feeding oxygen gas (4) into the catalyst zone via a dividing device. The oxygen gas is supplied through the catalyst elements of the catalyst zone. In the reactor (2), the gas (1) is arranged to flow to the catalyst zone (3) and arranged to contact with the oxygen gas (4) and the catalyst in the catalyst zone. Then the gas reacts with the oxygen gas by means of a catalytic partial oxidation on the catalyst elements. A purified gas (5) is formed during the reaction, and the purified gas is discharged from the reactor (2).

Example 2

FIG. 2 presents the method and also the apparatus for purifying the gas, such as synthesis gas, comprising tars and undesired hydrocarbons, e.g. benzene.

The apparatus comprises a catalytic treatment reactor (2) to which the gas (1) which comprises tars and undesired hydrocarbons is supplied. The catalytic treatment reactor (2) comprises the catalyst zone (3) with two vertical catalyst elements. Same catalyst including at least one catalyst component is arranged to the each catalyst elements. Further, the apparatus comprises at least one feeding device for feeding oxygen gas (4) into the catalyst zone via a dividing device. The oxygen gas is supplied through the catalyst elements of the catalyst zone. In the reactor (2), the gas (1) is arranged to flow to the catalyst zone (3) and arranged to contact with the oxygen gas (4) and the catalyst in the catalyst zone. Then the gas reacts with the oxygen gas by means of a catalytic partial oxidation on the catalyst elements. In the catalyst zone the temperature is about 800-1000° C.

Further, the apparatus comprises thermal treatment zone (7), such as thermal cracking, in which the gas is further treated by heat treatment at temperatures of about 1000-1300° C. An additional oxygen gas (6) is fed before the thermal treatment zone (7).

A purified gas (5) is formed during the reactions in the catalyst zone (3) and thermal treatment zone (7), and the purified gas (5) is discharged from the reactor (2).

Example 3

FIG. 3 presents the method and also the apparatus for purifying the gas, such as gasification gas, comprising tars and undesired hydrocarbons, e.g. benzene.

The apparatus is a combination of a fixed-bed gasifier (8) and a catalytic treatment reactor (2). The catalytic treatment reactor is a part of the fixed-bed gasifier. The gasification gas (1) which comprises tars and undesired hydrocarbons is supplied from the gasification part of the gasifier (8) to the catalytic treatment reactor part (2). The catalytic treatment reactor (2) comprises the catalyst zone (3) with three horisontal catalyst elements which may be the elements according to FIG. 4. Same catalyst including at least one catalyst component is arranged to the each catalyst elements. Further, the apparatus comprises at least one feeding device for feeding oxygen gas (4) into the catalyst zone via a dividing device. The oxygen gas is supplied into the catalyst elements and the oxygen gas is supplied through the catalyst elements such that the oxygen gas is supplied to a middle of the catalyst element and is arranged to flow from the middle of the catalyst element to the surface of the element. In the catalytic treatment reactor (2), the gas (1) is arranged to flow to the catalyst zone (3) and arranged to contact with the oxygen gas (4) and the catalyst of the catalyst elements in the catalyst zone. Then the gas reacts with the oxygen gas by means of a catalytic partial oxidation in the catalyst elements and/or on the catalyst elements. A purified gas (5) is formed during the reaction, and the purified gas is discharged from the reactor (2).

Example 4

In this example, a gasification gas (1) which comprises tars and undesired hydrocarbons is supplied to the catalytic treatment reactor (2). The catalytic treatment reactor (2) comprises the catalyst zone (3) with the horisontal catalyst elements (9). FIG. 4 presents one of the catalyst elements for purifying the gasification gas.

An oxygen containing gas (4) is injected to a center of the catalyst element (9) through a distributor pipe (10) which is a perforated tube or a tube equipped with several nozzle holes. Granular catalyst particles (11) are loaded around the oxygen distributor pipe to form a catalyst layer, and the whole structure is built inside a perforated supporting structure (12). The oxygen containing gas flows from the central pipe through the catalyst layer and meets the gasification gas components already in the catalyst layer, on the catalyst surfaces or in the pores of the catalyst. In this way, the oxidation reactions take place without soot formation and the gasification gas temperature is increased and tar content is reduced due to combined effects of thermal and catalytic reactions. Multiple catalyst elements can be organized to cover the cross-sectional area optimally to achieve enough contact between the gas and catalyst but without created high pressure drop. Several subsequent catalyst elements can be used to achieve temperature increase in multiple stages and to improve tar decomposition.

Example 5

In this example, a gasification gas (1) was purified in a separate catalytic treatment reactor (2) according to example 1.

The catalytic treatment reactor was arranged after two separation devices, e.g. cyclone and filtration devices after a gasifier, in which dust and particles were separated from the gas. The catalytic treatment reactor was a tubular reactor with the vertical catalyst element. The oxygen gas, comprising oxygen and nitrogen, was supplied to a middle of the catalyst element and was arranged to flow from the middle of the element to the surface of the element. The catalyst element was formed of granular porous catalyst particles supported by a stainless steel structure. The catalytic oxidation reactions took place in the catalyst element, and consequently no soot was formed.

Two tests were carried out. In test A, the gasification gas of the gasifier included 5.3 til-% $CH_4$, 1.1 til-% $C_2H_4$ and 0.2 til-% $C_2H_6$, and 8.0 g/m$^3$n benzene and 3.8 g/m$^3$ tars (1.1 g/m$^3$ tars<naphthalene, 1.8 g/m$^3$ naphthalene and 0.9 g/m$^3$ heavier tars). The purified gas, after the catalytic treatment reactor, included 2.7 til-% $CH_4$, 0.3 til-% $C_2H_4$ and 0.07 til-% $C_2H_6$, and 4.1 g/m$^3$n benzene and 1.0 g/m$^3$ tars (0.2 g/m$^3$ tars<naphthalene, 0.7 g/m$^3$ naphthalene and 0.1 g/m$^3$ heavier tars). The temperature of the gasification gas was 570° C. in the feeding to the catalytic treatment reactor, and the temperature of the purified gas was 850° C.

In test B, higher ratio of fuel and steam was used in the feeding to the gasifier. Thus, the contents of hydrocarbons and tars were higher in the gasification gas. In test B, the gasification gas of the gasifier included 6.8 til-% $CH_4$, 1.4 til-% $C_2H_4$ and 0.3 til-% $C_2H_6$, and 8.3 g/m$^3$n benzene and 10.4 g/m$^3$ tars (4.8 g/m$^3$ tars<naphthalene, 2.1 g/m$^3$ naphthalene and 3.5 g/m$^3$ heavier tars). The purified gas, after the catalytic treatment reactor, included 3.2 til-% $CH_4$, 0.3 til-% $C_2H_4$ and 0.09 til-% $C_2H_6$, and 4.2 g/m$^3$n benzene and 2.3 g/m$^3$ tars (0.8 g/m$^3$ tars<naphthalene, 0.9 g/m$^3$ naphthalene and 0.6 g/m$^3$ heavier tars). The temperature of the gasification gas was 570° C. in the feeding to the catalytic treatment reactor, and the temperature of the purified gas was 860° C.

From the tests, it was observed that the tars and undesired hydrocarbons, e.g. ethylene and benzene, can be decomposed effectively during the reaction in the catalytic treatment reactor. For example, 83-89% of the heavy tars and 73-79% of ethylene decomposed during the reaction in the catalytic treatment reactor. Further, it was observed that the purified gas does not include carbon black and particles. Further, it was observed that the surfaces of the devices were clean after the tests.

Example 6

In this example, a gasification gas (1) was purified according to example 3. The process was tested in a pilot scale combination comprising the pressurized fixed-bed gasifier and catalytic treatment reactor. The catalytic treatment reactor comprised four horizontal catalyst elements (9) according to FIG. 4. The lower part of the gasifier was operated as a counter-current fixed bed reactor, where primary oxygen, steam and carbon dioxide were fed to a bottom of the fixed bed and biomass was fed to a top of the bed from which it flow downwards through drying, pyrolysis, gasification and oxidation zones. The formed raw gas contained typically about 50-100 g/m3n of tars and was leaving the primary gasification stage at a temperature of 200-600° C. This tar-containing raw gas was heated gradually to a temperature of 800-900° C. in the catalytic treatment so that a major part of tars was decomposed without soot formation problems which are typical to ordinary methods. Four one-week-long tests were carried out with wood chips and pellets made of pine saw dust, bark, forest residues and sunflower husk. With all tested feedstocks, successful operation was reached, and the produced gas could be filtered from dust particles without blocking filters by the tars and soot and reformed from residual tars and hydrocarbon gases with state-of-the art catalytic reforming methods. A slipstream of the gas was further cleaned to sub-ppm level of contaminants and used as the feed gas of Fischer-Tropsch synthesis.

Two examples of test results are presented below.

In test A, the wood chips were used with a feed rate of 14.2 g/s and the raw gas was leaving the primary gasification zone at a temperature of 580° C. The gasifier was operated at 2.5 bar pressure. The oxygen containing gas was fed to four levels of the catalyst elements so that the temperature was raised to 862° C. Ceramic catalyst pellets containing zirconia and small amounts of precious metals were used as the catalyst in the catalyst elements. Same catalysts were used in all four test weeks, and no loss of activity or blocking by soot or dust was determined. The dry gas analysis after the catalytic treatment was the following: 14.7% CO, 20.3% $H_2$, 34.4 $CO_2$, 5.8% $CH_4$, 0.7% $C_2$-hydrocarbon gases and 24.2% $N_2$. Benzene content was 6.0 g/m3n and the total content of tars was 1.7 g/m3n. This gas was led through a gas cooler into the filter unit where it was filtered at 503° C. temperature with a stable pressure drop of 89 mbar. The subsequent gas cleaning devices, gas compressors and FT synthesis were operated without problems.

In test B, the bark pellets were used as the feedstock. Feed rate was 13.5 g/s and operation pressure 2.5 bar. Temperature of the raw gas was 446° C. before the catalyst elements, and the temperature after the catalyst elements was 862° C. The dry gas analysis after the catalytic treatment was the following: 16.3% CO, 17.6% $H_2$, 31.9 $CO_2$, 6.2% $CH_4$, 0.9% $C_2$-hydrocarbon gases and 27.0% $N_2$. Benzene content was 9.5 g/m3n and the total content of tars was 6.4 g/m3n. This feedstock contained more sulphur than the wood chips (test A), which reduced the reforming activity of the catalyst. However, the gas could be successfully filtered at 529° C. temperature with a stable pressure drop of 97 mbar. The subsequent gas cleaning devices, gas compressors and FT synthesis were operated without problems.

Tests 1 and 2 proved that tar concentrations could be reduced from a level of 50-100 g/m3n down to about 2-6 g/m³, which was sufficiently low to allow the use of further gas cleaning devices for cleaning of the raw gases of the fixed-bed gasifiers.

The gasifier, reactor, feeding devices and outlet devices of the process used in these examples are known per se in the art, and therefore they are not described in any more detail in this context.

The method and apparatus are suitable in different embodiments for purifying the gas, e.g. the synthesis gas, and for forming the purified gas.

The invention is not limited merely to the examples referred to above; instead many variations are possible within the scope of the inventive idea defined by the claims.

The invention claimed is:

1. A method for purifying a first gas having impurities including tars and/or undesired hydrocarbons, the first gas being selected from a group consisting of synthesis gas, gasification gas, flow from a gasifier, and/or coke oven glass, the method comprising:

supplying the first gas to a catalytic treatment reactor, the catalytic treatment reactor including at least one catalyst zone including at least one catalyst element, the catalyst element including a catalyst, a distributor pipe, and a perforated supporting structure, the catalyst including granular catalyst particles, the catalyst element being filled with the catalyst, the catalyst being loaded around the distributor pipe to form a catalyst layer, and the catalyst and the distributor pipe being surrounded by the perforated supporting structure, feeding an oxygen gas into the catalyst element of the catalyst zone in the catalytic treatment reactor and supplying the oxygen gas through the distributor pipe to a center of the catalyst element, the oxygen gas being arranged to flow from the center of the catalyst element through the catalyst layer to an outer surface of the catalyst element, wherein the first gas is arranged to flow to the catalyst zone and is arranged to contact with the oxygen gas and the catalyst such that first gas reacts with the oxygen gas (i) on a surface of the catalyst and/or (ii) in pores of the catalyst to form a purified gas, and discharging the purified gas from the catalytic treatment reactor.

2. The method according to claim 1 wherein the catalyst zone comprises more than one catalyst.

3. The method according to claim 1, wherein the catalyst element is formed from a coated element which has been coated with the catalyst.

4. The method according to claim 1, wherein the catalytic treatment reactor comprises more than one catalyst zone.

5. The method according to claim 1, further comprising supplying the first gas into the catalyst zone in the catalytic treatment reactor.

6. The method according to claim 1, further comprising treating the first gas by a thermal treatment in a thermal treatment zone after the catalyst zone, and the first gas is treated at temperatures of 1000-1300° C. in the thermal treatment.

7. The method according to claim 1, further comprising treating the purified gas after the catalytic treatment reactor.

8. The method according to claim 1, further comprising filtrating the purified gas.

* * * * *